Aug. 9, 1960
S. RUBEN
2,948,769
ELECTRIC CURRENT PRODUCING CELL
Filed Oct. 3, 1957
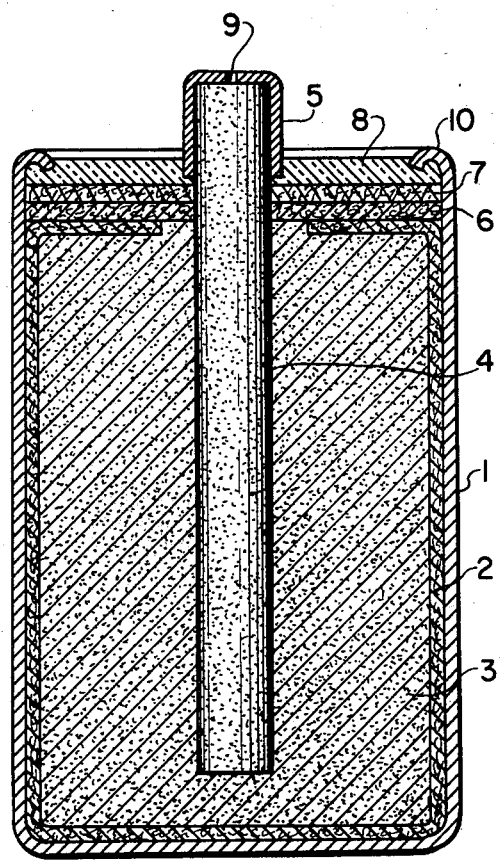
INVENTOR.
Samuel Ruben
BY
ATTORNEY

United States Patent Office 2,948,769
Patented Aug. 9, 1960

2,948,769

ELECTRIC CURRENT PRODUCING CELL

Samuel Ruben, 271 North Ave., New Rochelle, N.Y.

Filed Oct. 3, 1957, Ser. No. 687,927

8 Claims. (Cl. 136—102)

This invention relates to electric current producing cells, and, more particularly, to a galvanic cell utilizing a compound of mercury as its depolarizer.

In my co-pending application Serial No. 637,971, filed February 4, 1957, now Patent No. 2,814,664, dated November 26, 1957, I have disclosed primary cells comprising a cathode depolarizer of mercuric dioxysulfate (the basic sulfate of mercury, $3HgO.SO_3$), or ($2HgO.HgSO_4$) having a minor proportion of finely divided carbon admixed therewith, in combination with a zinc anode and a suitable aqueous electrolyte, such as a sulfate salt electrolyte, containing a small amount of an inhibitor, such as a soluble chromate. Preferably, a buffer agent is incorporated in the depolarizer or in the electrolyte to stabilize the pH throughout the useful life of the cell. In my co-pending application Serial No. 583,028, filed May 7, 1956, now Patent No. 2,814,663, dated November 26, 1957, I have disclosed primary cells employing a cathode depolarizer of mercuric dioxysulfate having a minor proportion of finely divided carbon admixed therewith, in combination with a zinc anode and an electrolyte composed of an aqueous solution of a metal salt of an organic acid selected from the group consisting of the acetates, tartrates and citrates of alkali metals, magnesium and zinc.

This application is a continuation-in-part of my above mentioned co-pending applications.

It is an object of the present invention to improve electric current producing cells of the type described in my co-pending applications referred to in the foregoing.

It is another object of the invention to provide a cell having a high ratio of current output capacity to cell volume, a relatively high ratio of current output above accepted cutoff voltage to total current output capacity, a substantially sustained voltage or flat voltage discharge curve with continuous output throughout a relatively long cell life, negligible leakage of end products after operating life and a relatively long shelf or open circuit life without undue internal deterioration.

It is a further object of the invention to provide a cell utilizing a mercury compound depolarizer which does not require the special structures employed in the mercuric oxide alkaline cell and which may be easily and conveniently produced in a number of cell and battery structures.

Other and further objects and advantages of the invention will become apparent from the following description and from the accompanying drawing, the single figure of which is a longitudinal sectional view, having parts in elevation of a cell structure embodying the invention.

I have found that in the cells disclosed in my above-mentioned co-pending applications comprising a zinc anode, a depolarizer of mercuric dioxysulfate admixed with carbon, and an electrolyte of the sulfate, acetate, tartrate or citrate type, there occurs an increase in the internal resistance of the cell after several months of storage, particularly at elevated temperatures. Most of this increase in internal resistance is localized at the interface where the zinc anode is in contact with the spacer. While this increase in resistance does not adversely affect the capacity of the cell at low current densities, such as up to about 10 milliamperes per square inch of anode surface, it may cause initially an excessive voltage drop at higher current densities. The phenomenon is apparently due to a reaction on the anode surface because the discharge voltage rises to the normal value and the output current increases after the initial drop when the load remains connected to the cell.

I have discovered that the above difficulty experienced with cells comprising a depolarizer of mercuric dioxysulfate and an electrolyte of the sulfate, acetate, tartrate, or citrate type may be practically eliminated by using electrolytes composed of aqueous solutions of certain salts of sulfamic acid ($HSO_3NH_2$) or ($NH_2SO_3H$). The preferred electrolyte is zinc sulfamate, $Zn(SO_3NH_2)_2$, although magnesium sulfamate, $Mg(SO_3NH_2)_2$, and the sulfamates of the alkali metals, sodium, potassium and lithium are also useful for the purposes of the present invention. By using the sulfamate electrolytes of the invention, the flash current of the cell remains constant over long periods of time and no increase in internal resistance is noted after extended periods of storage even at elevated temperatures.

As the sulfamates of the invention are quite soluble in water, aqueous electrolytes may be readily formed therefrom. The concentration of the electrolytes may be between 10% and 20%, for example excellent results are obtained with sulfamate solutions, specifically with a zinc sulfamate solution, having a concentration of about 15%. In most cases, it is desirable to add a small percentage of an inhibitor, such as 0.25% to 2% by weight of a soluble chromate, to the electrolyte in order to reduce the open circuit reactivity of the zinc anode with the electrolyte, an addition of about 1% by weight of potassium dichromate being very satisfactory for the purpose.

In the preparation of the depolarizer, the mercuric dioxysulfate is preferably mixed with carbon to insure low internal resistance throughout the useful life of the cell, suitable compositions being in the approximate range of 4 to 12 parts by weight of mercuric dioxysulfate to one part by weight of carbon black, a preferred mixture being 8 parts by weight of mercuric dioxysulfate and one part by weight of Shawinigan carbon black.

Referring now to the drawing, reference numeral 1 denotes the zinc can serving as the container and anode, which is preferably slightly amalgamated to assure maximum shelf life and uniform utilization of the anode surface. A porous liner 2 of kraft paper having a thickness of 0.003" is provided inside of the zinc can, said liner being coated with a mixture composed of 4% by weight of sodium carboxy-methylcellulose (CMC), 4% by weight of glycerine, balance water. In case self-amalgamation of the anode is desired, a small amount of mercuric sulfamate may be added to the spacer.

The depolarizer bobbin mix is prepared by milling 8 parts by weight of mercuric dioxysulfate with 1 part by weight of Shawinigan carbon black. These two materials are intimately mixed with each other. To each 9 gs. of this mix is added 4.0 cc. of electrolyte composed of an aqueous solution of zinc sulfamate having a concentration of 15% and containing 1% by weight of potassium dichromate as an inhibitor, said electrolyte having a pH of about 5.

After the liner 2 has been placed in container 1, depolarizer bobbin 3, which in an AA-size cell is composed of 11 grams of the above-described mix, is inserted, together with waxed or silicone-impregnated carbon rod 4, the bobbin being compressed and expanded against the paper liner to afford good contact.

Wax impregnated cardboard discs 6 and 7 are forced into the container 1 to hold down the top end portion of paper liner 2, which folds over the top surface of the bobbin under compression. The open end of the container is then rolled over as indicated at 10 and a layer 8 of fused hard wax is poured on top of disc 7 to seal the cell. The wax enters under the rolled over end of the container and upon solidification provides a reliable seal. A brass cap 5, forced over the outer end of carbon rod 4, constitutes one of the terminals of the cell and is provided with a small hole 9 to permit the escape of air or gas from the interior of the cell.

A cell of the described character and of the AA or penlight size, has a voltage of 1.45 volt, a flash current of 1.8 amperes and a capacity of 1400 milliampere hours. The flash current and capacity are not adversely influenced by long periods of storage at normal or even elevated temperatures.

Although the present invention has been disclosed in connection with a preferred embodiment thereof, variations and modifications may be resorted to without departing from the principles of the invention. I consider all of these variations and modifications to be within the true spirit and scope of the present invention as disclosed in the foregoing description and defined by the appended claims.

I claim:

1. An electric current producing cell comprising a zinc anode, a substantially neutral electrolyte composed of an aqueous solution of a sulfamate salt selected from the group consisting of alkali metal sulfamates, zinc sulfamate and magnesium sulfamate being substantially devoid of free sulfamic acid, and a cathode depolarizer the major portion of which is composed of mercuric dioxysulfate.

2. An electric current producing cell comprising a zinc anode, a substantially neutral electrolyte of zinc sulfamate, and a cathode depolarizer the major portion of which is composed of mercuric dioxysulfate, said electrolyte being substantially devoid of free sulfamic acid.

3. An electric current producing cell comprising a zinc anode, a substantially neutral electrolyte of magnesium sulfamate, and a cathode depolarizer the major portion of which is composed of mercuric dioxysulfate, said electrolyte being substantially devoid of free sulfamic acid.

4. An electric current producing cell comprising a zinc anode, a cathode depolarizer essentially consisting of a major proportion of mercuric dioxysulfate and a minor proportion of carbon black, and a substantially neutral electrolyte selected from the group consisting of alkali metal sulfamates, zinc sulfamate and magnesium sulfamate, said electrolyte being an aqueous solution having a concentration between 10% and 20% and being substantially devoid of free sulfamic acid.

5. An electric current producing cell comprising a zinc anode, a cathode depolarizer of which the effective depolarizer constituent consists preponderantly of mercuric dioxysulfate, and a substantially neutral electrolyte selected from the group consisting of alkali metal sulfamates, zinc sulfamate, and magnesium sulfamate containing a soluble chromate inhibitor, said electrolyte being substantially devoid of free sulfamic acid.

6. A primary cell comprising a zinc anode, a cathode depolarizer composed of a mixture of 4 to 12 parts by weight of mercuric dioxysulfate and 1 part by weight of finely divided carbon, and a substantially neutral aqueous electrolyte composed of a zinc sulfamate solution having a concentration of about 15% and containing a potassium dichromate inhibitor, said electrolyte being substantially devoid of free sulfamic acid.

7. A primary dry cell comprising a zinc anode can, a porous spacer layer lining said can, a compressed cathode depolarizer body composed of basic mercuric sulfate in intimate admixture with a minor amount of finely divided carbon in contact with said layer, and a substantially neutral electrolyte composed of an aqueous solution of a sulfamate selected from the group consisting of alkali metal sulfamates, zinc sulfamate and magnesium sulfamate and containing a small percentage of a soluble chromate inhibitor impregnating said cathode depolarizer, said electrolyte being substantially devoid of free sulfamic acid, said spacer layer being coated with a mixture of sodium carboxy-methylcellulose and glycerine.

8. A primary dry cell as claimed in claim 7, wherein the porous spacer layer contains a small amount of mercuric sulfamate.

References Cited in the file of this patent

UNITED STATES PATENTS

| | | |
|---|---|---|
| 1,839,498 | Porth | Jan. 5, 1932 |
| 2,810,006 | Ruben | Oct. 15, 1957 |
| 2,814,663 | Ruben | Nov. 26, 1957 |
| 2,814,664 | Ruben | Nov. 26, 1957 |